Sept. 9, 1969  G. A. GREGG  3,466,425
ELECTRICAL SPACE HEATER
Filed Aug. 18, 1966
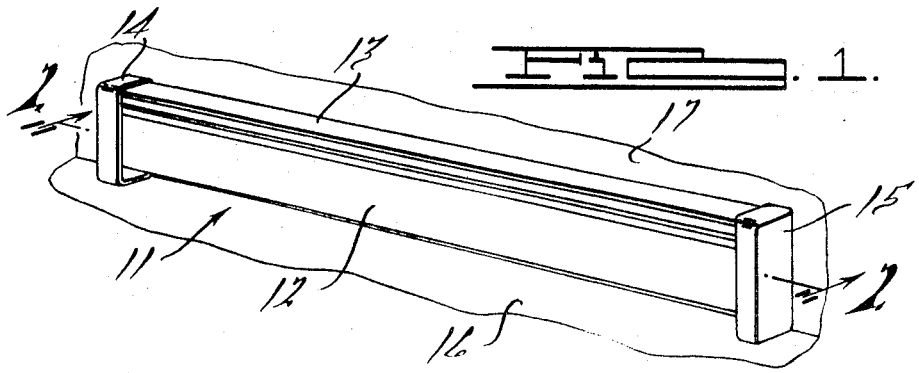
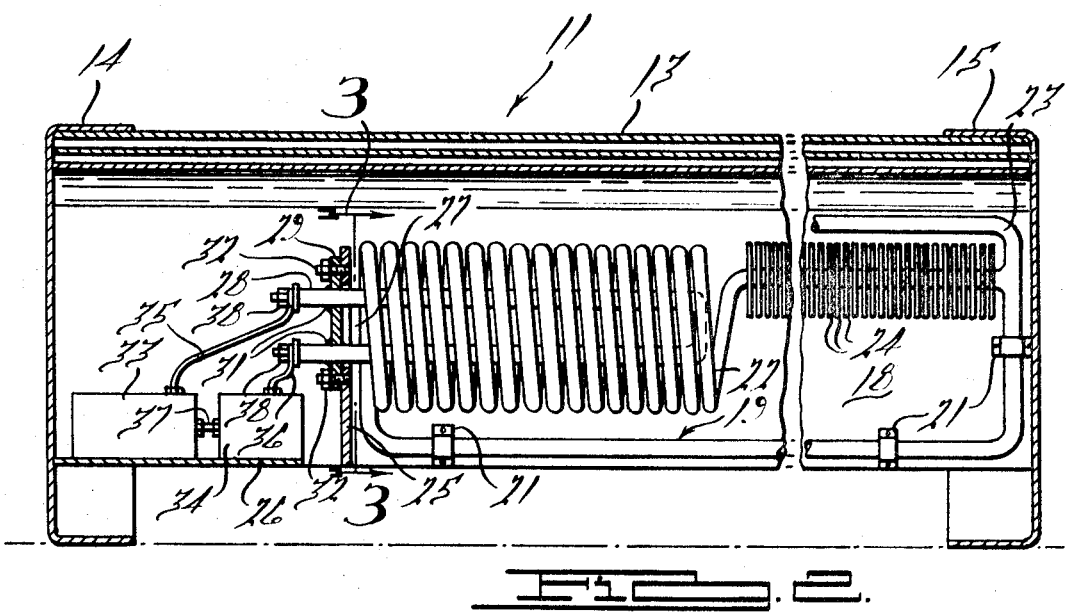
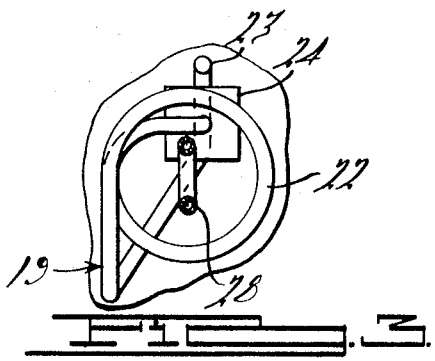
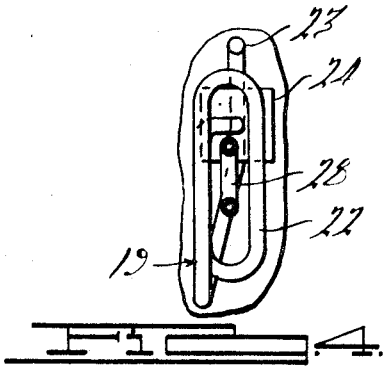
INVENTOR.
George A. Gregg
BY
Harness, Dickey & Pierce
ATTORNEYS

United States Patent Office 3,466,425
Patented Sept. 9, 1969

3,466,425
ELECTRICAL SPACE HEATER
George A. Gregg, 13322 E. Eight Mile Road,
Detroit, Mich. 48205
Filed Aug. 18, 1966, Ser. No. 573,308
Int. Cl. H05b 3/42; F28f 1/00
U.S. Cl. 219—341                              2 Claims

ABSTRACT OF THE DISCLOSURE

A fluid circulating-type electric baseboard space heater has a fluid filled conduit including intercommunicatively connected coiled portion, finned portion and return portion; the portions together forming a closed fluid circuition path. The conduit is horizontally supported within a baseboard space heater housing. The housing also supports a thermostatically controlled sheathed electric heating unit which extends within the full length of the coiled portion of the conduit for heating the fluid in the conduit. The turns of the coiled portion are spaced to permit radiant heat from the heating unit to pass directly therebetween to impinge directly on the housing. The coiled portion, finned portion, return portion and heating unit are exposed to air flowing through the housing.

Background of the invention

In previous electric space heaters of the fluid circulation type, the electric heating element has been mounted within the fluid conduit in direct contact with the fluid. While such a method of mounting the electric heating element has proven capable of rapidly heating the fluid, the heating element has shown itself to be generally difficult to service and expensive to replace because of its relatively inaccessible disposition within the fluid conduit and its elaborate mounting and sealing fixtures.

Summary of the invention

The invention pertains to a housing constructed to provide a convection flow of air and containing therein a liquid conduit. The conduit has a coiled portion, a finned portion, a return portion and an extending portion parallel to the coiled and finned portion and disposed thereabove, all forming a closed liquid circuit. An electric heating element is releasably supported within the coils of the coiled portion of the conduit for heating the liquid therein. The coils of the coiled portion are spaced to permit the heat from the heating unit to radiate directly onto the housing for heating it while the liquid within the coiled portion is being heated. With this arrangement the heating unit does not contact the liquid within the conduit and not only heats the liquid in the coiled portion but also directly heats the housing and the air passing thereover between the coils.

Brief description of the drawing

FIGURE 1 is a perspective view of an electric baseboard space heater of the fluid circulation type embodying features of the present invention;

FIG. 2 is a broken cross-sectional view on an enlarged scale of the structure illustrated in FIG. 1, taken along the line 2—2 thereof;

FIG. 3 is a cross-sectional view of the structure illustrated in FIG. 2, taken along the line 3—3 thereof, and FIG. 4 is a view similar to FIG. 3 but showing the convolutions in elongated rather than circular configuration.

Description of the preferred embodiment

Referring now to FIGURE 1, a baseboard space heater 11 having a front panel 12, a top panel 13, and mounting brackets 14 and 15 is shown installed on a floor 16 and against a wall 17. As best seen in FIG. 2, the space heater 11 also embodies a back panel 18 upon which a fluid conduit 19 is affixed by means of brackets 21. The fluid conduit 19 has a coiled portion 22 and a fluid expansion chamber 23. Fins 24 are secured to a length of the fluid conduit 19 between the coiled portion 22 and the chamber 23. The conduit is filled with water and an anti-freeze solvent up to the level of the expansion chamber 23 and is then hermetically sealed. A fixture 25 and a bottom platform 26 are joined to the back panel 18. The fixture 25 has an aperture 27 for accepting a Calrod-type heating element 28 secured to a mounting plate 29 by welds 31. The mounting plate 29 is attached to the fixture 25 by bolts 32 fastened into threaded apertures in the fixture 25. The bottom platform 26 supports an electrical outlet box 33 and a control box 34 for a thermostat relay and the like which are wired in series to the Calrod element 28 by wires 35, 36 and 37. The wires 35 and 36 are attached to the Calrod element 28 at insulated terminals 38 so that the electrical current is conducted only to the core of the Calrod element.

In operation, the Calrod element 28, when energized through the control box 34, generates heat which is absorbed by the fluid within the coiled portion 22 of the fluid conduit 19 and radiates heat which passes outwardly between the spaced turns of the coiled portion 22 to directly impinge upon the panels of the heater 11. The heated fluid circulates through the finned portion of the conduit 19, where the fins 24 radiate heat to the air. Air passing between the spirals of the coiled conduit portion 22 also takes up the heat radiated therefrom and from the Calrod heating element 28. The cooler fluid within the remaining length of conduit moves toward the coiled conduit portion 22 to be reheated by the Calrod element 28. The expansion chamber 23 prevents bursting of the fluid conduit 19 by providing room for the heated fluid to expand. It will be noted that the operation of the spacer heater 11 requires no moving parts, responds quickly to regulation by the element in the control box 34, and provides flameless safety.

As seen in FIGS. 2 and 3, the Calrod element is disposed within the coiled portion 22 of the fluid conduit 19. The foregoing disposition provides the greatest efficiency in heating the fluid within the conduit 19 while allowing the Calrod element to be out of contact with the fluid and fluid conduit 19. The Calrod element is conveniently removed for repair or replacement by unfastening the bolts 32 and disconnecting the wires 35 and 36 from the terminals 38, and with withdrawing the mounting plate 29 to which the Calrod element 28 is attached. The disposition of the Calrod element 28 as a separate component eliminates the hertofore known necessity of unsealing and resealing the fluid conduit when removing and replacing the Calrod element. In the present invention, the permanent hermetic sealing of the fluid conduit 19 is also made possible by the addition of an appropriate anti-freeze solvent to the fluid within the conduit 19.

As seen in FIGS. 3 and 4, the coiled portion 22 of the fluid conduit 19 may be either circular or elongated in cross-sectional configuration to suit the requirements for which the heater 11 is to be used. The alternative configurations are provided primarily to correspond to spatial requirements and do not adversely affect the maintenance features hereinabove described. Also, the heater 11 being generally a self-contained unit can be manufactured either for permanent installation or for portable use, with only minor variations in the arrangement of the outlet box 33 and control box 34.

It is to be understood that the space heater herein disclosed and described is presented for the purpose of

What is claimed is:

1. A space heater having a housing for a flow of air inwardly and outwardly thereof, a liquid conduit having a coiled portion and a finned portion horizontally disposed and located above a return portion thereof, a conduit extension disposed above said coiled and finned portion in conducting relation therewith, an electrical heating unit, a mounting plate on said unit, mounting means on said housing, and means for releasably securing said mounting plate on said mounting means with the heating unit disposed horizontaly within said coiled portion and extending substantially the full length thereof, the turns of the coiled portion being spaced to permit radiant heat from said heating unit to directly pass therebetween, said coiled, finned and return portions of said conduit and said heating unit being exposed to and traversed by air flowing through the housing.

2. A space heater having a housing for a flow of air inwardly and outwardly thereof as recited in claim 1, wherein said coiled portion is of oval shape, and wherein said heating unit is supported within the coiled portion on the major axis thereof.

References Cited

UNITED STATES PATENTS

| | | | |
|---|---|---|---|
| 1,293,896 | 2/1919 | Paasche | 219—303 X |
| 1,393,531 | 10/1921 | Howard | 219—365 X |
| 1,408,634 | 3/1922 | Passmore et al. | 219—304 X |
| 1,875,844 | 9/1932 | Braunagel | 219—365 X |
| 1,561,706 | 11/1925 | Duffie | 219—303 |
| 1,673,567 | 6/1928 | Hynes | 219—303 X |
| 1,684,845 | 9/1928 | Parker et al. | 219—208 |
| 1,710,943 | 4/1929 | Odell | 219—303 |
| 2,203,425 | 6/1940 | Welch | 219—365 X |
| 2,260,895 | 10/1941 | Gibson | 237—16 |
| 2,276,093 | 3/1942 | Robbins | 237—17 X |
| 2,772,342 | 11/1956 | Reynolds et al. | 219—341 |
| 2,982,841 | 5/1961 | MacCracken | 219—303 X |
| 3,179,788 | 4/1965 | Uhlig | 219—341 |

FOREIGN PATENTS 524,239    5/1921    France.

ANTHONY BARTIS, Primary Examiner

U.S. Cl. X.R.

126—101; 165—101; 237—16; 219—303, 365